United States Patent
Yousefzadeh

[19]

[11] Patent Number: 5,887,802
[45] Date of Patent: Mar. 30, 1999

[54] NIGHT LIGHT ADAPTOR

[76] Inventor: Kamran Yousefzadeh, 1727 S. Bentley Ave., #201, Los Angeles, Calif. 90025

[21] Appl. No.: 901,947

[22] Filed: Jul. 29, 1997

Related U.S. Application Data

[63] Continuation-in-part of Ser. No. 683,259, Jul. 18, 1996, Pat. No. 5,758,850.

[51] Int. Cl.⁶ ..................................................... F21V 17/00

[52] U.S. Cl. ................. 248/220.21; 248/231.61; 362/457; 428/28

[58] Field of Search ......................... 248/231.61, 220.21, 248/231.81, 309.1; 362/444, 356, 351, 358, 457, 404; 428/28; D26/154; 439/11, 918; 200/51 R, 51.17

[56] References Cited

U.S. PATENT DOCUMENTS

| | | | |
|---|---|---|---|
| 2,997,576 | 8/1961 | Heitshu | 362/356 X |
| 3,092,695 | 6/1963 | Abrams | 439/11 X |
| 4,498,125 | 2/1985 | Schumaker | 362/356 X |
| 4,979,084 | 12/1990 | Krauthamer | 362/356 X |
| 5,262,209 | 11/1993 | Sawyer. | |
| 5,339,618 | 8/1994 | Sawyer. | |
| 5,613,772 | 3/1997 | Sawyer. | |

*Primary Examiner*—Ramon O. Ramirez
*Assistant Examiner*—Long Dinh Phan
*Attorney, Agent, or Firm*—Scot A. Reader

[57] ABSTRACT

A night light adaptor has threads for interchangeably receiving decorative finials and a plate mount for shielding a night light bulb from view and interchangeably receiving different artistic displays. The adaptor extends the aesthetic benefits of finials and surface-mountable materials into a night light environment.

17 Claims, 2 Drawing Sheets

5,887,802

NIGHT LIGHT ADAPTOR

This application is a continuation-in-part of application Ser. No. 08/683,259, filed Jul. 18, 1996, now U.S. Pat. No. 5,758,850.

FIELD OF THE INVENTION

This invention relates to adaptors and devices for displaying decorative objects and, more particularly, to a night-light adaptor for displaying finials.

BACKGROUND OF THE INVENTION

Finials are ornamental objects whose primary known use is to beautify table lamps. Finials include a decorative portion, which varies in design, and may include a bore having an internal thread for mating the finial with a finial receiver, also called a finial stud, of a table lamp. The decorative portion of finials is known to be designed and manufactured in many different sizes, shapes and styles, with each different design providing a unique visual appearance. In contrast, the bore of finials is generally of a common size so that the bore is compatible with most finial receivers, which typically have a size ¼"-27 or ⅛" IPS external thread. Thus, the table lamp user is usually able to selected a finial of a preferred size, shape and style from among a wide variety of ornamental designs.

It has long been known to use a single finial to beautify the top of a table lamp. In that application, the threaded bore of a finial is typically mated with the harp screw of the lamp to secure a center ring of a lamp shade therebetween. After mating, the decorative portion of the finial remains above the lamp shade, creating an aesthetically pleasing visual impression. The finial thus helps secure the lamp shade to the lamp base while at the same time beautifying the top of the lamp.

While the visual benefits of finials are well-known from the above-described application, the use of finials has been limited primarily to the top of a table lamp. The visual benefits of finials are not known to have extended to other utilitarian devices such as night lights, as there is no ready means to attach a finial.

SUMMARY OF THE INVENTION

In one aspect, the invention provides an adaptor for displaying a decorative finial on a night light. The adaptor has a night light receiver at one end for engaging the neck of a night light on the side opposite a wall plug. An arm extends from the night light receiver and terminates at a finial receiver at the other end of the adaptor. The finial receiver preferably has threads for interchangeably receiving different standard-sized finials, although a particular finial may be integrally formed with the receiver. The aesthetic benefits of finials are thereby translated into a night light environment.

In another aspect, a plate mount for holding a plate in a generally upright position is disposed along the length of the arm. The plate receivable in the plate mount serves the dual purpose of shielding the night light bulb from view and providing a surface for use in any number of ways, such as a mirror or for an artistic display. The aesthetic benefits of surface-mountable materials are thereby also translated into a night light environment.

The above and other objects and advantages of the invention will become more apparent from the accompanying drawings and detailed description. Of course, the actual scope of the invention is defined by the appended claims.

DETAILED DESCRIPTION OF THE PREFERRED EMBODIMENT

Figure 1:
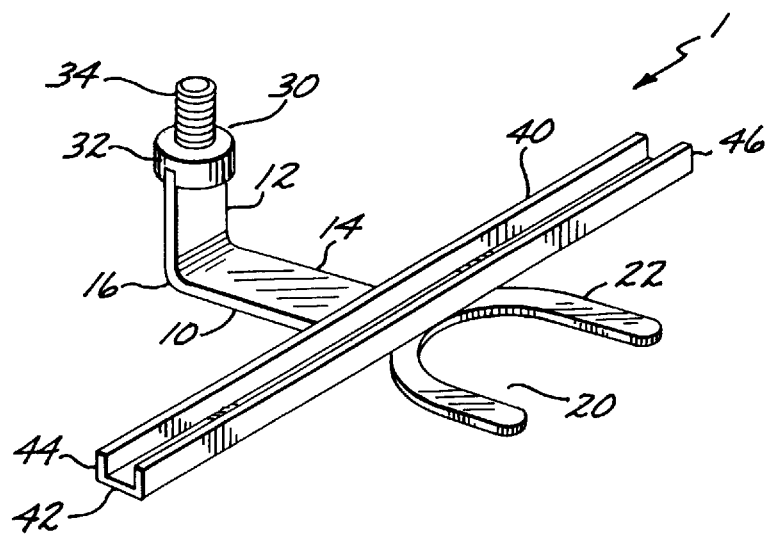
FIG. 1 a perspective view of the night light adaptor of the present invention.
Figure 2:
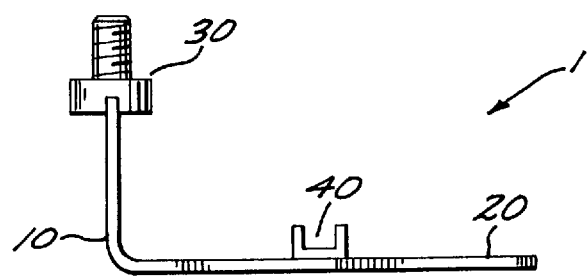
FIG. 2 is a side view of the adaptor of FIG. 1.

Turning to FIGS. 1 and 2, in a preferred embodiment of the invention, night light adaptor 1 is shown. Adaptor 1 is preferably made of brass, although other materials, such as wood or plastic, may be used. Adaptor 1 has arm 10 with upper section 12 and lower section 14 conjoined by elbow 16. At the end of lower section 14 opposite elbow 16 is a night light receiver 20. Night light receiver 20 has curved fingers 22, 24 for engaging the neck of a night light. Fingers 22, 24 are rigid and form a generally semi-circular slot for engaging the neck of a night light, although in other embodiments fingers may be flexible and manipulated by hand to surround the entire neck of a night light. At the end of upper section 12 opposite elbow 16 is finial receiver 30. Finial receiver 30 preferably has base 32 and threaded portion 34 above base 32. Threaded portion 34 preferably has a size ¼"-27 or ⅛" IPS external thread for engaging the mounting section of a standard-sized finial.

Disposed along the length of lower section 14 generally perpendicular to section 14 is plate mount 40. Plate mount has base 42 and walls 44, 46 extending from base 42 forming a slot for holding a plate in generally rigid retention. Although plate mount 40 is shown disposed along lower section 14 near night light receiver 20, a plate mount could in other embodiments be advantageously positioned at other locations along the length of section 14 where a plate could be held in the mount without preventing a finial from being contemporaneously mounted on finial receiver 30.

Figure 3:
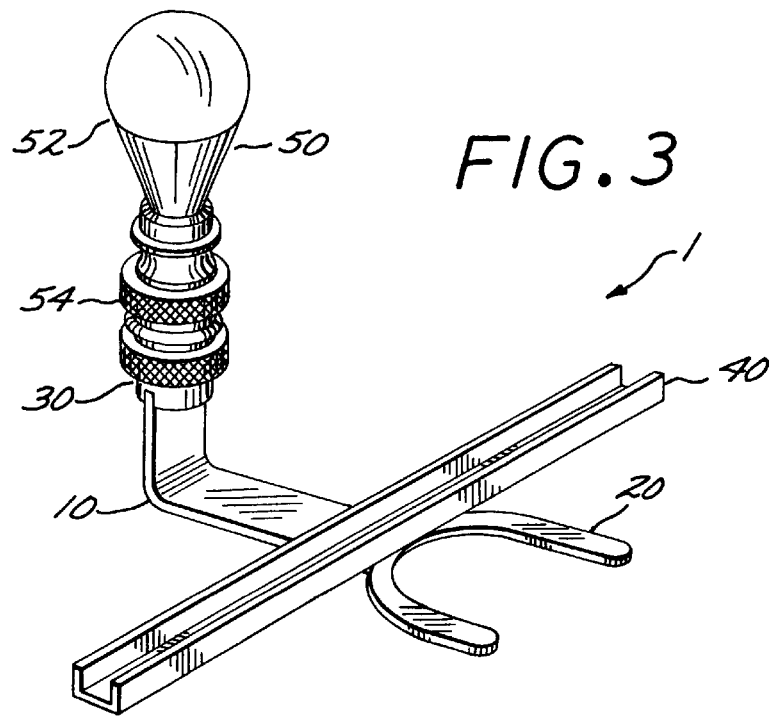
FIG. 3 is a perspective view of the adaptor of FIG. 1 displaying a finial.

Referring to FIG. 3, adaptor 1 is shown with a finial 50 displayed thereon. Finial 50 includes a decorative section 52 and a mounting section 54. Mounting section 54 preferably has an internally threaded bore for mating with threaded portion 34 of adaptor 1, although in other embodiments adaptor 1 and finial 50 may be integrally formed. If adaptor 1 and finial are not integrally formed, finial 50 may be replaced as a component by another standard-sized finial whenever desired for aesthetic or other reasons.

Figure 4:
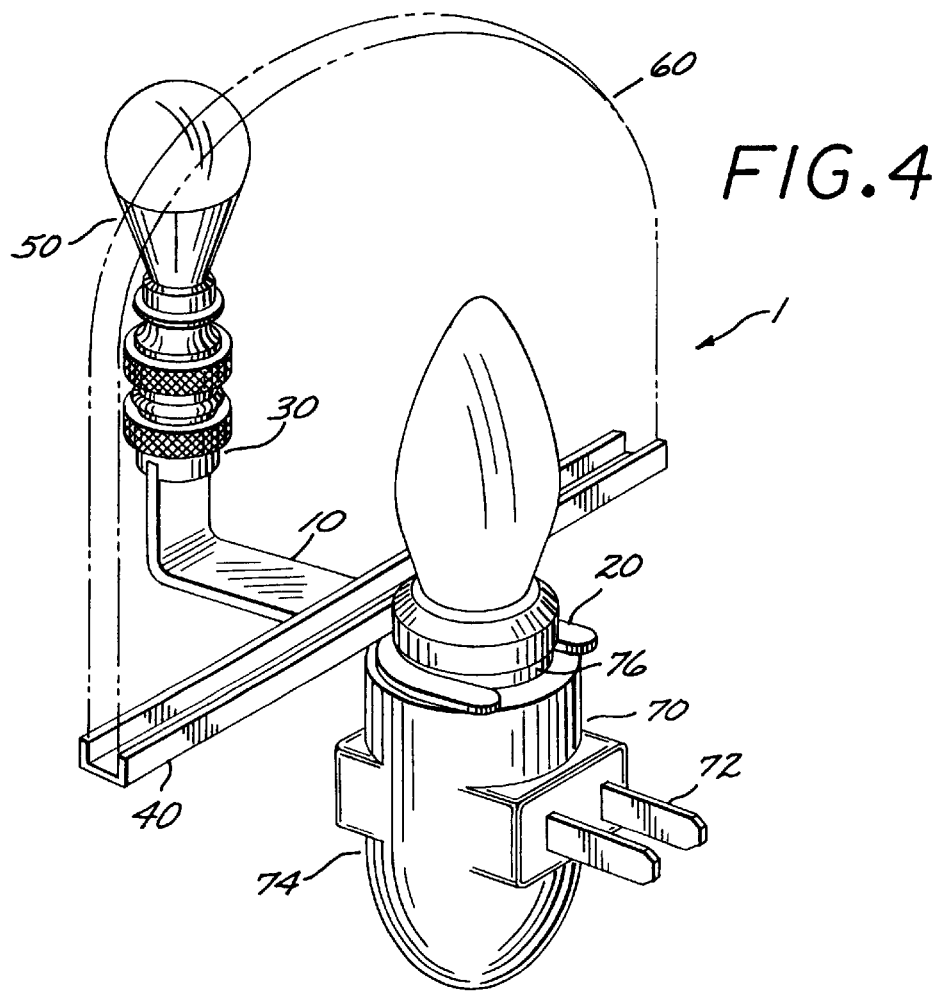
FIG. 4 is a perspective view of the adaptor of FIG. 3 engaging a night light.

Turning now to FIG. 4, adaptor 1 is shown with finial 50, plate 60 and night light 70 mounted thereon. Plate 60 preferably has a flat, constant thickness bottom for slidably engaging with plate mount 40. Glue may be applied as necessary to retain plate 60 and plate holding member 40 in generally rigid retention. Plate 60 may be composed of any generally rigid material which softens or blocks the light emanating from light bulb 78, such as reflective glass, stained glass, metal, wood, rubber or cardboard. Plate 60 may be selected by the user for utilitarian or aesthetic reasons. Materials, such as artwork, may be surface mounted on plate 60 if desired. Night light 70 preferably has a plug 72 for plugging the light into an electrical outlet, a body 71 associated with the plug 72 for housing electrical components, a neck 76 atop body 74 surrounding a socket and light bulb 78 mounted atop neck 76. Neck 76 preferably has a round shape for slidably engaging with night light receiver 20. Glue may be applied as necessary to retain neck 76 and receiver 20 in generally rigid retention. In an alternative flexible-finger arrangement, generally rigid retention may also be accomplished by hand-manipulating the fingers to surround the neck of the night light and interconnecting the ends of the flexible fingers by a screw or similar means.

It will be apparent from the foregoing that, while particular forms of the invention have been illustrated and described, various modifications can be made without departing from the scope and spirit of the invention. Accordingly, it is not intended that the invention be limited expect by the pending claims.

I claim:

1. A night light adaptor, comprising:
    an arm;
    a finial at a first end of said arm;
    a night light receiver at a second end of said arm, said night light receiver having curved fingers forming a concave slot; a plate mount on said arm between said first and second ends, said plate mount having a base and walls forming a slot.

2. The night light adaptor of claim 1, wherein said plate is composed of a rigid material.

3. The night light adaptor of claim 2, wherein said plate is composed of an opaque material.

4. The night light adaptor of claim 2, wherein said plate is composed of a semi-transparent material.

5. The night light adaptor of claim 1, wherein said arm has a finial receiver at said first end, said finial receiver having threads for receiving said finial.

6. The night light adaptor of claim 5, wherein said threads are size ¼"-27.

7. The night light adaptor of claim 1, wherein said arm and said finial are integrally formed.

8. A night light adaptor, comprising:
    an arm;
    a finial receiver at a first end of said arm, said finial receiver having threads for receiving a finial;
    night light receiver at a second end of said arm, said night light receiver having curved fingers forming a concave slot; a plate mount on said arm between said first and second ends, said plate mount having a base and walls forming a slot.

9. The night light adaptor of claim 8, wherein said threads are size ¼"-27.

10. The night light adaptor of claim 8, wherein said threads are size ¼"-27.

11. A night light adaptor, comprising:
    an arm;
    a finial at a first end of said arm;
    a night light receiver at a second end of said arm, said night light receiver having flexible fingers, said fingers manipulable by hand to surround the neck of a night light; a plate mount on said arm between said first and second ends, said plate mount having a base and walls forming a slot.

12. The night light adaptor of claim 11, wherein said plate is composed of a rigid material.

13. The night light adaptor of claim 12, wherein said plate is composed of an opaque material.

14. The night light adaptor of claim 12, wherein said plate is composed of a semi-transparent material.

15. The night light adaptor of claim 11, wherein said arm has a finial receiver at said first end, said finial receiver having threads for receiving said finial.

16. The night light adaptor of claim 15, wherein said threads are size ¼"-27.

17. The night adaptor of claim 11, wherein said arm and said finial are integrally formed.

* * * * *